July 12, 1949.  P. G. HANSEL  2,475,612
DIRECTION FINDING SYSTEM
Filed June 27, 1945

*INVENTOR.*
PAUL G. HANSEL
BY
ATTORNEY

Patented July 12, 1949

2,475,612

UNITED STATES PATENT OFFICE 2,475,612

DIRECTION FINDING SYSTEM

Paul G. Hansel, Red Bank, N. J.

Application June 27, 1945, Serial No. 601,909

8 Claims. (Cl. 343—118)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to radio direction finders, particularly those which employ a direct-reading cathode-ray bearing indicators of the phase meter type.

The invention is generally applicable to all direction finders wherein the output of the receiver consists of a low frequency signal whose phase is a function of the bearing, particularly wherein the phase of said low frequency signal is indicated by either a cardioid or propeller-shaped display on the screen of a cathode-ray tube. For purposes of illustration, however, there will be described herein two types of direction finders to which this invention can be advantageously applied.

One difficulty with direction finders of the above type is encountered when the desired signals are relatively weak and/or of short duration. Under such conditions it is difficult to distinguish the bearing display and the extraneous traces produced by random atmospheric and receiver noises. This is particularly true when bearings are being taken on signals of transient character, such as bursts of atmospheric static in connection with weather and storm observations. This difficulty is related to psychological factors, such as persistence of vision, which cause the operator to concentrate his attention on the steady noise patterns and to ignore the bearing patterns of transient static bursts.

One important object of this invention is to improve the performance of direction finders when the strength of the received signal is very small compared to the operating noise levels.

Another object of this invention is to facilitate the observation of accurate bearings on atmospheric static bursts and other signals of transient character and/or short duration.

Figure 1:
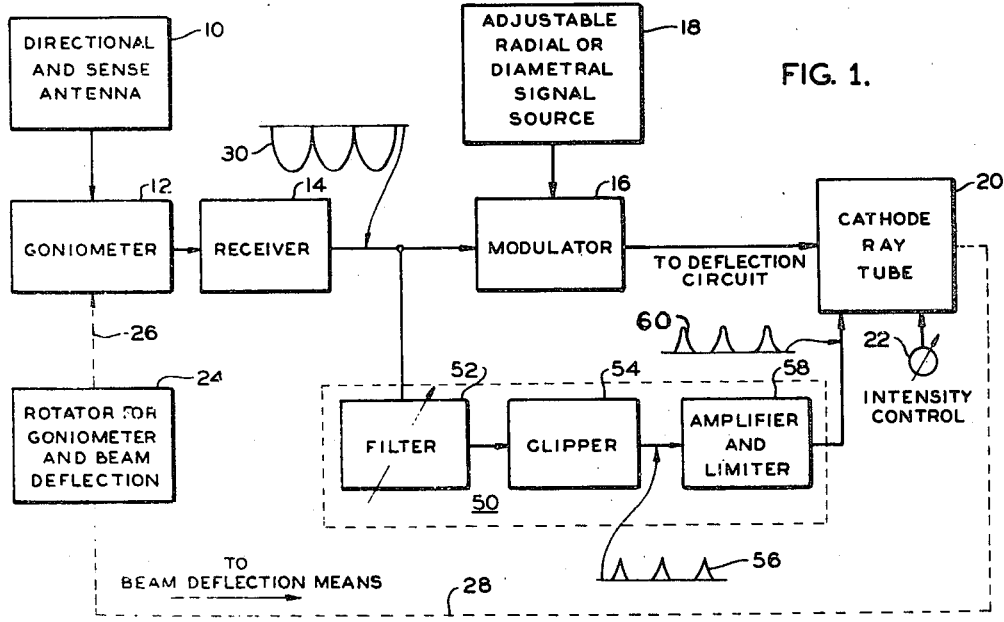
Figure 2A:
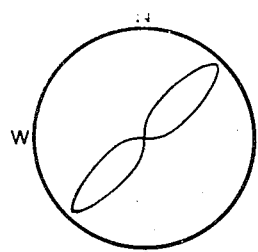
Figure 2B:
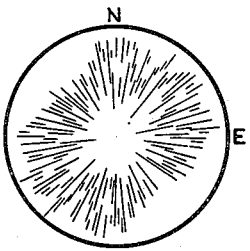
Figure 2C:
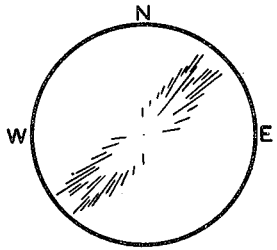
Figure 3A:
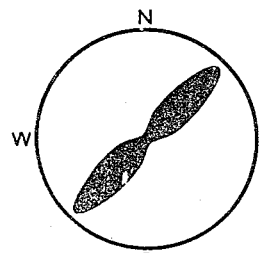
Figure 3B:
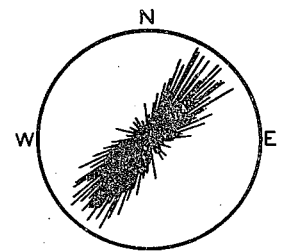
Figure 3C:
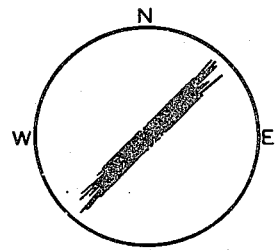

For a better understanding of the invention, together with other and further objects thereof, reference is had to the following description taken in connection with the accompanying drawings, wherein:

Figure 1 is a block diagram of my invention;

Figures 2A, 2B, and 2C are sketches of oscilloscope patterns illustrating the operation of my invention as applied to one type of direction finding system; and Figures 3A, 3B, and 3C are sketches of oscilloscope patterns illustrating the operation of my invention as applied to another type of direction finding system.

Referring now particularly to Fig. 1, the block 10 generally indicates a directional antenna array, which may include sense-antenna means. The antenna array feeds a gonoimeter 12, the output of which is applied to a receiver 14. The output of receiver 14 is applied to a modulator 16 to which is also applied a source of beam-deflecting potential 18, which may be direct or alternating current. The output of modulator 16 is applied to the beam-deflecting means of a cathode-ray tube 20 to produce a radial or diametral deflection of the trace. A manually adjustable means 22 functions to control the steady bias on the intensity grid of the cathode-ray tube to adjust the normal beam brightness. A means 24 continuously rotates the goniometer, and synchronously therewith rotates the plane of deflection of the cathode-ray beam, as indicated by broken lines 26 and 28, whereby the antenna scans continuously in azimuth and at the same time a rotating beam deflection field is produced which corresponds to the effective scanning pattern of the antenna array. The received signal functions to vary the magnitude of the rotating deflection field.

As thus far described the system is conventional and can take several specific forms. One of these forms is that known as the Army SCR—291 described on pp. 118–124 of the November 1944 issue of "Electronics" magazine. In accordance with this system the goniometer 12 includes a rotatable search coil, rotating means 24 is a motor, and the cathode-ray beam-deflecting means is an electromagnet mounted on a rotating yoke. Rotation of the goniometer produces in the output of the receiver a rectified, negative low frequency wave having a frequency which is equal to the rotation frequency of the goniometer or harmonically related thereto, and having a phase which is dependent upon the bearing of the received signal. Component 18 is an adjustable direct-current applied, through modulator 16, to the deflecting magnet of cathode-ray tube 20 to adjust the initial position of the beam.

The varying phase output 30 of receiver 14, varies the magnitude of the deflecting current whereby the radial deflection of the beam is dependent upon the instantaneous amplitude of wave 30. In this case the deflecting field is maximum when the signal voltage is minimum, i. e., the deflection field is inversely proportional to the signal voltage. Because of the rotation of the deflecting magnet, and because the magnitude of beam displacement from the center of the screen is inversely proportional to the amplitude of the negative-going receiver output, variations in amplitude and phase of wave 30 cause the cathode-ray beam to trace a propeller-shaped outline on the screen of the cathode-ray tube, as shown in Fig. 2A, the tips of said propeller corresponding to the nulls of the receiver output and pointing to the bearing of the incoming wave.

As above noted, interference due to random noise causes random traces on the oscilloscope screen which obscure and/or distort the image, making it difficult to observe accurately the orientation of the propeller pattern, particularly when the desired signals are of a transient or an intermittent nature, e. g., atmospheric static bursts which are to be tracked for weather observation purposes. An illustration of the image under such noise conditions is given in Fig. 2B. It will be seen that the screen is covered with irregular, radial streaks which make the propeller pattern very hazy and its direction indefinite and difficult to observe. These streaky, ever-changing patterns also distract the operator, increasing the difficulties in tracking and causing quick fatigue.

To improve the presentation under the adverse conditions above described, the output of receiver 14, in addition to its usual function to radially displace the cathode-ray beam, is also, in accordance with this invention, used as a bearing-dependent signal for controlling the beam brightness, preferably after filtering and shaping. To this end, the rectified output signal 30 of receiver 14 is passed through a filtering and shaping network which is relatively sharply-tuned to pass waves having the frequency of wave 30, whereby it filters out most of the noise. Network 50 also narrows and limits the wave, which is then applied to the intensity grid of the oscilloscope to brighten the beam.

Network 50 includes a filter 52 relatively sharply-tuned to the frequency of wave 30. The phase characteristic of filter 52 is made such that the peak of the waves in its output coincides with the null of the signal 30. For this purpose the phase characteristic of filter 52 is preferably made adjustable. The output of the filter is then narrowed to provide pulses which are narrower than a half-cycle of the receiver output 30. In accordance with this embodiment of my invention, this narrowing is accomplished by passing it through a clipper circuit 54 which passes only the peaks of the waves in the region of the null zones, as shown at 56. These peaks are then amplified and limited at 58 to slightly widen the pulses, whereby positive pulses 60 having an amplitude which is independent of the input amplitude are produced. Pulses 60 are then applied to the intensity grid of the oscilloscope.

In normal operation, the intensity control 22 is adjusted until only a faint trace is visible on the oscilloscope screen. When a signal is received, increased beam intensity is produced only over a narrow strip across the screen which substantially coincides with the tips of the propeller-shaped indicating pattern, as shown at Fig. 2C.

The intensity of the indicating pattern is substantially independent of signal strength because of the limiting employed in the production of the intensity-modulating pulses. As a result of this intensity modulation of the beam, the contrast between the bearing indication and the traces due to random noise is considerably increased, so that bearings can be read with comparative ease on extremely weak signals and on signals of short duration.

From the above description, it will be seen that the essence of my invention is the simultaneous employment of filtered, bearing-dependent intensity modulation, in addition to the usual, unfiltered, bearing-dependent radial or diametral control of the rotating beam deflection field of the oscilloscope. This mode of operation permits retention of all of the advantages which characterize the propeller-shaped presentation, while eliminating the limitations which have heretofore existed.

Another example of equipment to which my present invention can be profitably applied is one in which component 18 is a source of alternate current of a frequency which is high compared to the rate of rotation of the plane of beam deflection of cathode ray tube 20, in which case a diametral deflection signal is applied to the cathode ray tube through modulator 16. Such an equipment is disclosed in my copending application, entitled "Receiving apparatus," Serial No. 541,950, filed June 24, 1944, which disclosure has been published in the April 1945 issue of "Electronics," pages 86–91. To apply my present invention to this equipment, it is merely necessary to add the above-described filtering and shaping network 50, with the input of said network connected to the output of receiver 27, and with the output of said network connected to the intensity grid of oscilloscope 38 of said copending application.

The type of indication normally produced on the oscilloscope of said copending application is shown in Fig. 3A. It will be seen that this indication is propeller-shaped as in Fig. 2A, the only difference, in this respect, being that the propeller pattern is filled in, i. e., a solid area of light is produced, as distinguished from the line pattern of Fig. 2A. The effects of noise and interference on the pattern shown in Fig. 3A, is illustrated in Fig. 3B. Finally, Fig. 3C shows the resultant pattern which is obtained by the use of my present invention.

While there has been described what is at present considered a preferred embodiment of my invention, it will be obvious to those skilled in the art that various changes and modifications may be made therein without departing from the invention, and it is aimed in the appended claims to cover all such changes and modifications as fall within the true spirit and scope of the invention.

I claim:

1. A direction finding system comprising: a direction finding antenna and a receiver cooperating therewith to produce a low-frequency signal whose phase is a function of the direction of arrival of the received wave, a cathode-ray tube, means to generate in said tube a rotating beam-deflecting field having an angular velocity equal to the angular frequency of said low-frequency signal, means for controlling the instantaneous magnitude of said beam-deflecting field as an inverse function of the instantaneous magnitude of said low-frequency signal; and means for controlling the beam intensity of said cathode-ray tube, said last-named means comprising means for filtering from said low-frequency signal at least a portion of the noise components superimposed thereon, means for converting the filtered signal into control pulses, each of said pulses having a duration shorter than half-cycle periods of said low-frequency signal and a phase which is such that the peaks thereof substantially coincide with the nulls of said low-frequency signal, means for adjusting the amplitude and shape of said pulses, and means responsive to each of said pulses to increase the brightness of the beam of said cathode ray tube.

2. A direction finding system comprising: a direction finding antenna and a receiver employed cooperatively to produce a low-frequency signal whose phase is a function of the direction of arrival of the received wave, a cathode-ray tube provided with a rotating beam-deflecting field harmonically-related in angular velocity to the angular frequency of said low-frequency signal, means for controlling the instantaneous magnitude of said beam-deflecting field as an inverse function of the instantaneous magnitude of said low-frequency signal; and means for controlling the beam intensity of said cathode-ray tube; said last-named means comprising means for filtering said low-frequency signal, means for converting the filtered signal into control pulses having a duration shorter than half-cycle periods of said low-frequency signal, means for adjusting the amplitude, phase and shape of said pulses, and means responsive to each of said pulses to increase the intensity of the beam of said cathode-ray tube.

3. A direction finding system comprising: a direction finding antenna and a receiver cooperating to produce a low-frequency signal whose phase is a function of the direction of arrival of the received wave, a cathode-ray tube means to generate in said tube a rotating beam-deflecting field harmonically-related in angular velocity to the angular frequency of said low-frequency signal, means for controlling the instantaneous magnitude of said beam-deflecting field as an inverse function of the instantaneous magnitude of said low-frequency signal; and means for controlling the beam intensity of said cathode-ray tube; said last-named means comprising means for converting said low-frequency signal into control pulses, each of said pulses having a duration shorter than half-cycle periods of said low-frequency signal, means for adjusting the phase of said pulses and means responsive to each of said pulses to increase the intensity of the beam of said cathode-ray tube.

4. A direction finding system comprising: a direction finding antenna and a receiver cooperating therewith to produce a low-frequency signal whose phase is a function of the direction of arrival of the received wave, a cathode-ray tube excited by said signal to provide an indication of the phase relation of said signal, and auxiliary means for controlling solely the beam intensity of said cathode-ray tube, said last-named means comprising means for converting said low-frequency signal into control pulses having a duration shorter than half-cycle periods of said low-frequency signal, means for adjusting the phase of said pulses so that they are coextensive with the nulls of said signal, and means responsive to each of said pulses to increase the intensity of the beam of said cathode-ray tube.

5. In a direction finding system including a directional antenna array and a cathode-ray oscilloscope, the method of indicating the direction of arrival of a signal impressed upon said antenna array which comprises the steps of continuously rotating the effective direction of said antenna array, converting the output of said antenna array into a rectified, direction-dependent wave having an angular frequency equal to the angular frequency of said rotation and having a phase which is dependent upon the direction of arrival of said signal, generating a rotating beam-deflecting field having an angular velocity harmonically related to the frequency of said wave, controlling the instantaneous magnitude of said field inversely with the instantaneous amplitude of said wave, controlling with said wave the generation of pulses of shorter duration than a half-cycle of said wave, adjusting the timing of said pulses so that they are substantially concurrent with the nulls of said wave, and increasing with each of said pulses the beam intensity of said cathode-ray oscilloscope.

6. In a direction finding system including a direction antenna array and a cathode-ray oscilloscope, the method of indicating the direction of arrival of a signal impressed upon said antenna array which comprises the steps of continuously rotating the effective direction of said antenna array, converting the output of said antenna array into a rectified, direction-dependent wave having an angular frequency equal to the angular velocity of said rotation and having a phase which is dependent upon the direction of arrival of said signal, generating a rotating beam-deflecting field having an angular frequency equal to the frequency of said wave, controlling the instantaneous magnitude of said field inversely with the instantaneous amplitude of said wave, generating from said wave positive-going pulses of shorter duration than a half-cycle of said rectified wave, adjusting the phase relation of said pulses so that they are substantially concurrent with the nulls of said wave, and varying in the same direction the beam intensity of said cathode-ray oscilloscope with each of said pulses.

7. In a direction finding system including a directional antenna array and a cathode-ray oscilloscope, the method of indicating the direction of arrival of a signal impressed upon said antenna array which comprises the steps of rotating the effective direction of said antenna array, converting the output of said antenna array into a direction-dependent wave having an angular frequency equal to the angular velocity of said rotation and having a phase which is dependent upon the direction of arrival of said signal, generating a beam-deflecting field which moves along one coordinate at a rate which is proportional to the frequency of said wave, varying said field along a second coordinate in accordance with the instantaneous amplitude of said wave, generating from said wave pulses of shorter duration than a half-cycle of said wave, adjusting the timing of said pulses so that they are substantially concurrent with the nulls of said wave, and increasing with each of said pulses the beam intensity of said cathode-ray oscilloscope.

8. In a direction finding system including a directional antenna array and a cathode-ray oscilloscope, the method of indicating the direction of arrival of a signal impressed upon said antenna array, which comprises the steps of continuously rotating the effective direction of said antenna array, converting the output of said antenna array into a direction-dependent wave having a phase which is dependent upon the direction of arrival of said signal, generating a beam-deflecting field which moves along one coordinate at a rate which is related to the frequency of said wave, varying said field along another coordinate in accordance with the instantaneous amplitude of said wave, shortening the duration of said waves, and varying in the same direction with each of said shortened waves the beam intensity of said cathode-ray oscilloscope.

PAUL G. HANSEL.

REFERENCES CITED

The following references are of record in the file of this patent:

UNITED STATES PATENTS

| Number | Name | Date |
|---|---|---|
| 2,208,378 | Luck | July 16, 1940 |
| 2,213,273 | Earp | Sept. 3, 1940 |
| 2,279,466 | Jonske et al. | Apr. 14, 1942 |
| 2,320,908 | Busignies | June 1, 1943 |
| 2,388,262 | Ganiayre et al. | Nov. 6, 1945 |
| 2,406,800 | Busignies | Sept. 31, 1946 |

FOREIGN PATENTS

| Number | Country | Date |
|---|---|---|
| 881,292 | France | Jan. 22, 1943 |